(12) United States Patent
Lim et al.

(10) Patent No.: US 8,890,667 B2
(45) Date of Patent: Nov. 18, 2014

(54) APPARATUS AND METHOD FOR PROVIDING VISUAL-HAPTIC INFORMATION, AND BUTTON HAVING THE SAME

(75) Inventors: Jeong-Mook Lim, Daejeon (KR); Ki-Uk Kyung, Daejeon (KR); Hee-Sook Shin, Daejeon (KR); Dong-Woo Lee, Daejeon (KR); Yo-An Lim, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 434 days.

(21) Appl. No.: 13/303,768

(22) Filed: Nov. 23, 2011

(65) Prior Publication Data

US 2012/0154134 A1    Jun. 21, 2012

(30) Foreign Application Priority Data

Dec. 17, 2010  (KR) .................. 10-2010-0130041

(51) Int. Cl.
| | |
|---|---|
| G08B 6/00 | (2006.01) |
| G06F 3/023 | (2006.01) |
| H01H 13/85 | (2006.01) |
| H01H 13/83 | (2006.01) |
| G06F 3/01 | (2006.01) |
| H01H 9/18 | (2006.01) |
| G06F 3/02 | (2006.01) |
| H01H 3/00 | (2006.01) |

(52) U.S. Cl.
CPC .............. G06F 3/016 (2013.01); G06F 3/0238 (2013.01); H01H 2215/044 (2013.01); H01H 2215/05 (2013.01); H01H 2003/008 (2013.01); H01H 13/85 (2013.01); H01H 2219/016 (2013.01); H01H 13/83 (2013.01); H01H 2217/032 (2013.01); H01H 2215/052 (2013.01); H01H 2219/012 (2013.01); H01H 9/181 (2013.01); G06F 3/0202 (2013.01)

USPC ............ 340/407.2; 341/27; 341/28; 200/314; 345/168

(58) Field of Classification Search
USPC .................. 340/407.1, 407.2; 341/22, 27, 28; 200/314
See application file for complete search history.

(56) References Cited

U.S. PATENT DOCUMENTS

| | | | |
|---|---|---|---|
| 8,674,941 B2* | 3/2014 | Casparian et al. ............. | 345/168 |
| 2005/0237306 A1* | 10/2005 | Klein et al. .................... | 345/168 |
| 2006/0179088 A1 | 8/2006 | Kang | |
| 2007/0152974 A1 | 7/2007 | Kim et al. | |
| 2008/0131184 A1* | 6/2008 | Brown et al. ................. | 400/490 |
| 2011/0242009 A1* | 10/2011 | Gray ............................. | 345/173 |

FOREIGN PATENT DOCUMENTS

| | | | |
|---|---|---|---|
| KR | 1020060089823 A | | 8/2006 |
| KR | 1020070073125 A | | 7/2007 |
| KR | 10-2010-0030030 A | | 3/2010 |
| KR | 10-2010-0074404 A | | 7/2010 |

* cited by examiner

*Primary Examiner* — Brian Zimmerman
*Assistant Examiner* — Sara Samson

(57) ABSTRACT

A button for providing visual-haptic information includes a visual-haptic variable button that adaptively provides various types of visual-haptic information according to input of information to an electronic apparatus. The visual-haptic variable button includes a visual information output part that adaptively changes various types of button icons according to manipulation and touch of the visual-haptic variable button for the input of information, thereby outputting visual information, and a haptic information output part that adaptively changes various types of sense of button manipulation and sense of button touch according to the manipulation and touch of the visual-haptic variable button, thereby outputting haptic information. At least one visual-haptic variable button is provided in the electronic apparatus for the input of information.

17 Claims, 10 Drawing Sheets

APPARATUS AND METHOD FOR PROVIDING VISUAL-HAPTIC INFORMATION, AND BUTTON HAVING THE SAME

CROSS-REFERENCE TO RELATED APPLICATIONS

The present application claims priority of Korean Patent Application No. 10-2010-0130041, filed on Dec. 17, 2010, which is incorporated herein by reference in its entirety.

BACKGROUND OF THE INVENTION

1. Field of the Invention

Exemplary embodiments of the present invention relate to input/output of visual-haptic information, and more particularly, to an apparatus and a method for providing users with visual-haptic information through a visual-haptic touch button, and a button provided with an apparatus for providing the visual-haptic information to provide the visual-haptic information.

2. Description of Related Art

At the present time, buttons for inputting information to an electronic apparatus have been designed in various shapes according to the purposes thereof, but are basically divided into mechanical buttons for providing physical tactile sensation and button icons for visually outputting the meaning of the buttons. Furthermore, the buttons for inputting information to the electronic apparatus include buttons attached to computer keyboards, manipulations buttons of various portable devices (e.g., phone books, terminals, electronic notes, game machine and the like), buttons attached to remote controllers and various electronic products, which may be met with everywhere, and the like.

At the present time, buttons provided in an electronic apparatus have various shapes and sizes, but actually have an apparatus for providing visual information and an apparatus for providing haptic information. For example, buttons having the apparatus for providing haptic information may include springs, and buttons having the apparatus for providing visual information may be provided with button icons attached to the upper portions of the buttons such that a user recognizes the meanings of the buttons.

Furthermore, the apparatus for providing haptic information may have various shapes using oil pressure and the like, as well as the above-mentioned springs, and a sense of button manipulation and a sense of button touch are determined at the initial manufacturing stage and provided as the haptic information. The button icons provided at the upper portions of the buttons for providing visual information to output the visual information may be printed, engraved or embossed on the buttons provided in electronic apparatuses, and recently, may include LEDs and the like.

However, the sense of button manipulation and the sense of button touch (i.e., the haptic information) of the buttons having the apparatus for providing haptic information, which are realized using springs, oil pressure and the like, are difficult to be changed if they are completely manufactured through the initial manufacturing stage as described above. When changing the sense of button manipulation and the sense of button touch of the buttons already manufactured in order to provide haptic information using springs, oil pressure and the like, it is necessary to add separate buttons. Although the separate buttons are provided, it is difficult to accurately provide a sense of button manipulation and a sense of button touch as haptic information.

Furthermore, the buttons provided with the button icons printed, engraved or embossed thereon or include LEDs and the like are added to the buttons already manufactured in order to provide haptic information using the above-mentioned springs, oil pressure and the like according to the purposes thereof, that is, buttons already manufactured in order to mechanically provide haptic information. In other words, buttons for providing visual-haptic information are manufactured by adding the buttons for providing visual information to buttons manufactured in order to mechanically provide haptic information. Therefore, when the purposes of the buttons are changed, it is difficult to change button icons.

As described above, since the visual-haptic information (i.e., the button icons, the sense of button manipulation, and the sense of button touch) of the buttons for providing visual-haptic information are determined at the manufacturing stage, it is difficult to variably provide visual-haptic information thereafter. In this regards, it is necessary to provide a scheme for easily providing various types of visual-haptic information adaptively according to the purposes of buttons.

SUMMARY OF THE INVENTION

An embodiment of the present invention is directed to an apparatus and a method for adaptively providing various types of visual-haptic information according to the purposes of a button.

Another embodiment of the present invention is directed to an apparatus and a method for providing various types of visual-haptic information in order to allow a user easily and actively to use various types of electronic apparatuses according to the purposes of a button used for inputting information to the electronic apparatuses, and a button having the apparatus for providing visual-haptic information.

Another embodiment of the present invention is directed to an apparatus and a method for providing various types of visual-haptic information by adaptively changing a button icon, a sense of button manipulation, and a sense of button touch according to the purposes of a button although the button is completely manufactured, and a button having the apparatus for providing visual-haptic information.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a button for providing visual-haptic information includes: a visual-haptic variable button that adaptively provides various types of visual-haptic information according to input of information to an electronic apparatus, wherein the visual-haptic variable button includes: a visual information output part that adaptively changes various types of button icons according to manipulation and touch of the visual-haptic variable button for the input of information, thereby outputting visual information; and a haptic information output part that adaptively changes various types of sense of button manipulation and sense of button touch according to the manipulation and touch of the visual-haptic variable button, thereby outputting haptic information, wherein at least one visual-haptic variable button is provided in the electronic apparatus for the input of information.

In accordance with another embodiment of the present invention, an apparatus for providing visual-haptic information through a visual-haptic variable button includes: a setting part that sets button information of the visual-haptic variable button; a control part that outputs setting information on visual information and setting information on haptic information by using the button information; a visual information output part that provides the visual information by using the setting information on visual information; and a haptic information output part that provides the haptic information by using the setting information on haptic information, wherein the haptic information output part moves the visual information output part in a vertical direction or allows the visual information output part to vibrate according to manipulation and touch of the visual-haptic variable button, includes a plurality of haptic elements in order to move the visual information output part in the vertical direction or allow the visual information output part to vibrate, and heights of the plurality of haptic elements are changed according to the manipulation and touch of the visual-haptic variable button.

In accordance with another embodiment of the present invention, a method for providing visual-haptic information through a visual-haptic variable button includes: setting layout information including a button size and a button type, an icon image according to a button state, an output force function, a button state, a button state critical value, and an initial height of a button with respect to the visual-haptic variable button; generating setting information of visual-haptic information provided through the visual-haptic variable button; and adaptively changing a button icon, a sense of button manipulation, and a sense of button touch according to the setting information, thereby providing the visual-haptic information through the visual-haptic variable button, wherein a height of the visual-haptic variable button is changed according to manipulation and touch of the visual-haptic variable button, and in the providing of the visual-haptic information, haptic information is provided by adaptively changing the sense of button manipulation and the sense of button touch according to a height of the visual-haptic variable button, and visual information is provided by adaptively changing a shape, a size and a color of the button icon according to the height of the visual-haptic variable button.

DESCRIPTION OF SPECIFIC EMBODIMENTS

Figure 1:
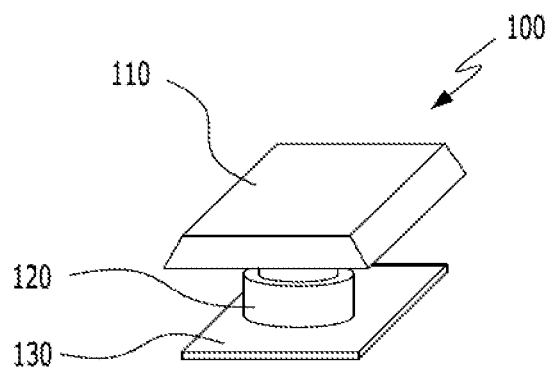
FIGS. 1 to 4 are diagrams explaining a visual-haptic variable button in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention proposes an apparatus and a method for providing users with visual-haptic information through a button used in order to input information to various electronic apparatuses, and a button having the apparatus for providing visual-haptic information. An embodiment of the present invention proposes an apparatus and a method for variously providing visual-haptic information by adaptively changing a button icon into visual information, and a sense of button manipulation and a sense of button touch into haptic information according to the purposes of a button provided in various electronic apparatuses, and a button having the apparatus for providing visual-haptic information.

Furthermore, an embodiment of the present invention proposes a visual-haptic variable button for changing a button icon, a sense of button manipulation, and a sense of button touch according to the purposes of a button used in order to input information to various types of electronic apparatuses after being manufactured. The visual-haptic variable button adaptively changes the button icon, the sense of button manipulation, and the sense of button touch according to the purposes of the button as described above, and provides various types of visual-haptic information so that a user easily and actively uses the electronic apparatuses. The visual-haptic variable button adaptively changes the button icon, the sense of button manipulation, and the sense of button touch in order to achieve accurate mapping of the functional meaning of buttons used in order to input information according to the purposes of the electronic apparatuses or software or program driven in the electronic apparatuses, thereby providing visual-haptic information.

That is, the visual-haptic variable button in accordance with the embodiment of the present invention is provided in various types of electronic apparatuses to input information, and provides various types of visual-haptic information by adaptively changing the button icon, the sense of button manipulation, and the sense of button touch according to the input of information to the electronic apparatuses, in other words, the manipulation and touch of the visual-haptic variable button. The visual-haptic variable button may serve as an apparatus for providing visual-haptic information, or includes the apparatus for providing visual-haptic information. Hereinafter, the visual-haptic variable button in accordance with the embodiment of the present invention will be described in more detail with reference to FIGS. 1 to 4.

Figure 2:
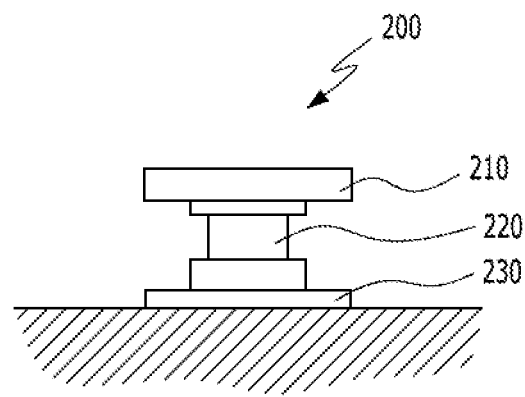
Figure 3:
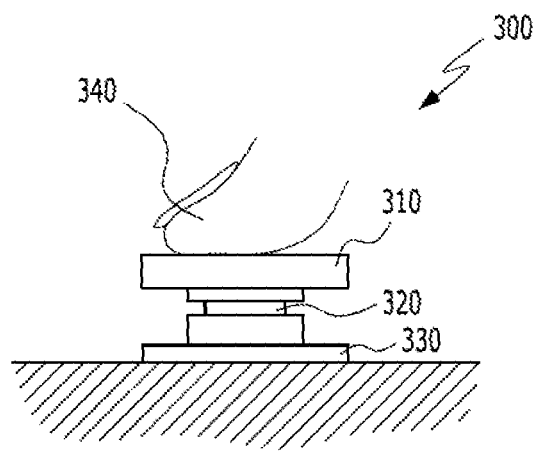
Figure 4:
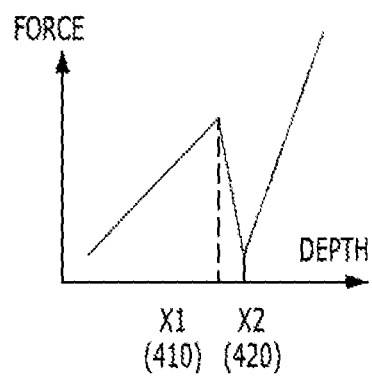

FIGS. 1 to 4 are diagrams explaining a visual-haptic variable button in accordance with an embodiment of the present invention. FIG. 1 is a perspective view illustrating the structure of the visual-haptic variable button, FIG. 2 is a sectional view illustrating the structure of the visual-haptic variable button, FIG. 3 is a sectional view illustrating the structure of the visual-haptic variable button when information is input through the visual-haptic variable button, and FIG. 4 is a graph illustrating the output of haptic information according to the operation the visual-haptic variable button.

Referring to FIGS. 1 to 4, visual-haptic variable buttons 100, 200 and 300 include visual information output parts 110, 210 and 310 for outputting button icons to provide visual information, haptic information output parts 120, 220 and 320 for providing haptic information as a sense of button manipulation and a sense of button touch, and support parts 130, 230 and 330 for supporting the visual information output parts 110, 210 and 310 and the haptic information output parts 120, 220 and 320, that is, the visual-haptic variable buttons 100, 200 and 300, respectively.

The visual information output parts 110, 210 and 310 output the button icons to provide the visual information, include display elements, and are positioned at the outermost or uppermost portions of the visual-haptic variable buttons 100, 200 and 300, respectively. The display elements used for the visual information output parts 110, 210 and 310 may include LCD panels, LED panels and the like, and display the button icons through the outer peripheral surfaces thereof using thin film elements to output visual information.

The visual information output parts 110, 210 and 310 accurately map the functional meanings of buttons to be used for the accurate input of information according to the purposes of an electronic apparatus or software or program driven in the electronic apparatus, thereby outputting button icons. For example, when software or program such as game is driven in the electronic apparatus, the visual information output parts 110, 210 and 310 accurately map and output button icons, which represents the meanings of functional keys to be used by a user in the game, thereby providing the user with visual information.

The visual information output parts 110, 210 and 310 may be provided at the upper portion thereof with transparent sensors (not illustrated) for measuring contact or contact force of the visual-haptic variable buttons 100, 200 and 300 caused by the manipulation or touch of a user when the user manipulates or touches the visual-haptic variable buttons 100, 200 and 300 for the input of information (refer to reference numeral 340). When the user manipulates or touches the visual-haptic variable buttons 100, 200 and 300 for the input of information (refer to reference numeral 340), the visual information output parts 110, 210 and 310 change and output button icons according to the manipulation or touch. That is, the visual information output parts 110, 210 and 310 adaptively change and output the button icons according to the manipulation or touch of the visual-haptic variable buttons 100, 200 and 300, thereby providing various types of visual information.

The haptic information output parts 120, 220 and 320 connect the support parts 130, 230 and 330 to the visual information output parts 110, 210 and 310 to move the visual information output parts 110, 210 and 310, and are positioned under the visual information output parts 110, 210 and 310, respectively. The haptic information output parts 120, 220 and 320 are formed of a motor, a piezoelectric material and the like, which generate a mechanical signal of displacement or force according to an electrical signal, and may have a pressure sensor (not illustrated) or a displacement sensor (not illustrated) therein.

When the user manipulates or touches the visual-haptic variable buttons 100, 200 and 300 for the input of information (refer to reference numeral 340), the haptic information output parts 120, 220 and 320 move the visual information output parts 110, 210 and 310 according to the contact or contact force of the visual-haptic variable buttons 100, 200 and 300, which is caused by the manipulation or touch of the user, respectively. At this time, the haptic information output parts 120, 220 and 320 generate vibration or vertical displacement of the visual information output parts 110, 210 and 310 according to the contact or contact force of the visual-haptic variable buttons 100, 200 and 300, thereby allowing the visual information output parts 110, 210 and 310 to vibrate or moving the visual information output parts 110, 210 and 310 in the vertical direction, respectively.

The haptic information output parts 120, 220 and 320 include a plurality of small haptic elements arranged in order to provide the sense of button manipulation and the sense of button touch as haptic information as described above according to the input of information through the visual-haptic variable buttons 100, 200 and 300, in other words, according to the manipulation or touch. That is, the haptic information output parts 120, 220 and 320 include a plurality of small haptic elements arranged according to the sizes of the visual-haptic variable buttons 100, 200 and 300 in order to provide haptic information by outputting the sense of button manipulation and the sense of button touch.

Furthermore, when the user manipulates or touches the visual-haptic variable buttons 100, 200 and 300 for the input of information (refer to reference numeral 340), the haptic information output parts 120, 220 and 320 move the visual information output parts 110, 210 and 310 according to the manipulation or touch, thereby representing the sense of button manipulation and the sense of button touch, respectively. That is, the haptic information output parts 120, 220 and 320 adaptively change and output the sense of button manipulation and the sense of button touch according to the manipulation and touch of the visual-haptic variable buttons 100, 200 and 300, thereby providing various types of haptic information, respectively.

In more detail, when the user manipulates or touches the visual-haptic variable buttons 100, 200 and 300 for the input of information as illustrated in FIG. 3 (refer to reference numeral 340), the visual information output parts 110, 210 and 310 move in the vertical direction according to the contact or contact force of the visual-haptic variable buttons 100, 200 and 300 caused by the manipulation or touch of the user. At this time, as illustrated in FIG. 4, the haptic information output parts 120, 220 and 320 output variable force (i.e., a variable mechanical signal) in order to adaptively change the sense of button manipulation and the sense of button touch according to the depth by which the visual information output parts 110, 210 and 310 move in the vertical direction. Here, when the user manipulates or touches the visual-haptic variable buttons 100, 200 and 300 as described above (refer to reference numeral 340), the haptic information output parts 120, 220 and 320 move the visual information output parts 110, 210 and 310 in the vertical direction according to the contact or contact force of the visual-haptic variable buttons 100, 200 and 300, which is caused by the manipulation or touch of the user, respectively.

For example, when the user manipulates or touches (e.g., presses) the visual-haptic variable buttons 100, 200 and 300 and the visual information output parts 110, 210 and 310 move down to a depth x1 (410) in the vertical direction, the haptic information output parts 120, 220 and 320 output force increasing at a predetermined rate according to the movement depth of the visual information output parts 110, 210 and 310, thereby providing the sense of button manipulation and the sense of button touch, that is, haptic information, respectively. In this way, the haptic information output parts 120, 220 and 320 output the force increasing at the predetermined rate when the visual-haptic variable buttons 100, 200 and 300 are pressed, thereby providing the user with down-pressing feeling of the visual-haptic variable buttons 100, 200 and 300 as the sense of button manipulation and the sense of button touch.

Furthermore, when the user manipulates or touches (e.g., presses) the visual-haptic variable buttons 100, 200 and 300 and the visual information output parts 110, 210 and 310 move down to a maximum depth in the vertical direction beyond the depth x1 (410), the haptic information output parts 120, 220 and 320 output force decreasing at a predetermined rate according to the movement depth of the visual information output parts 110, 210 and 310, thereby providing the sense of button manipulation and the sense of button touch, that is, haptic information, respectively. In this way, the haptic information output parts 120, 220 and 320 output the force decreasing at the predetermined rate when the visual-haptic variable buttons 100, 200 and 300 are pressed and the visual information output parts 110, 210 and 310 move beyond a predetermined depth, thereby providing the user with maximum down-pressing feeling of the visual-haptic variable buttons 100, 200 and 300 as the sense of button manipulation and the sense of button touch.

Meanwhile, when the user manipulates or touches (e.g., unpresses) the visual-haptic variable buttons 100, 200 and 300 and the visual information output parts 110, 210 and 310 move up to a depth x2 (420) or more from the maximum depth, the haptic information output parts 120, 220 and 320 output force increasing at a predetermined rate according to the movement depth of the visual information output parts 110, 210 and 310, thereby providing the sense of button manipulation and the sense of button touch, that is, haptic information, respectively. In this way, the haptic information output parts 120, 220 and 320 output the force increasing at the predetermined rate when the visual-haptic variable buttons 100, 200 and 300 are unpressed, thereby providing the user with up-pressing feeling of the visual-haptic variable buttons 100, 200 and 300 as the sense of button manipulation and the sense of button touch.

As described above, the haptic information output parts 120, 220 and 320 output the force increasing or decreasing at the predetermined rate, that is, a variable mechanical signal, in consideration of the magnitude of the up-movement and down-movement according to the up-movement and down-movement of the visual information output parts 110, 210 and 310 in the vertical direction in correspondence with the manipulation and touch (i.e., the pressing and unpressing) of the visual-haptic variable buttons 100, 200 and 300, thereby providing the sense of button manipulation and the sense of button touch. That is, the haptic information output parts 120, 220 and 320 provide various types of haptic information adaptively changed according to the manipulation and touch of the visual-haptic variable buttons 100, 200 and 300. Furthermore, while the haptic information output parts 120, 220 and 320 are providing the haptic information by outputting the sense of button manipulation and the sense of button touch adaptively changed according to the manipulation and touch of the visual-haptic variable buttons 100, 200 and 300, the visual information output parts 110, 210 and 310 provide visual information by outputting button icons changed according to the up-movement and down-movement of the visual information output parts 110, 210 and 310 caused by the manipulation and touch of the visual-haptic variable buttons 100, 200 and 300. For example, the visual information output parts 110, 210 and 310 adaptively change the shapes, sizes, and colors of the button icons according to the up-movement and down-movement, thereby providing various types of visual information.

So far, only the case has been described, in which when the visual information output parts 110, 210 and 310 move up and down in the vertical direction according to the manipulation and touch (i.e., the pressing and unpressing) of the visual-haptic variable buttons 100, 200 and 300, that is, when a user manipulates or touches the visual-haptic variable buttons 100, 200 and 300 for the input of information, the haptic information output parts 120, 220 and 320 move the visual information output parts 110, 210 and 310 in the vertical direction according to the contact or contact force of the visual-haptic variable buttons 100, 200 and 300 caused by the manipulation and touch of the user. However, the visual-haptic variable buttons 100, 200 and 300 in accordance with the embodiment of the present invention can be similarly applied to the case in which the haptic information output parts 120, 220 and 320 allow the visual information output parts 110, 210 and 310 to vibrate according to the contact or contact force of the visual-haptic variable buttons 100, 200 and 300.

That is, when the visual information output parts 110, 210 and 310 vibrate according to the manipulation and touch (i.e., the pressing and unpressing) of the visual-haptic variable buttons 100, 200 and 300 in accordance with the embodiment of the present invention, the haptic information output parts 120, 220 and 320 output force increasing or decreasing at a predetermined rate, that is, a variable mechanical signal, according to the magnitude of the vibration of the visual information output parts 110, 210 and 310, thereby providing the sense of button manipulation and the sense of button touch. Furthermore, while the haptic information output parts 120, 220 and 320 are providing the haptic information by outputting the sense of button manipulation and the sense of button touch according to the manipulation and touch of the visual-haptic variable buttons 100, 200 and 300, the visual information output parts 110, 210 and 310 provide visual information by outputting button icons changed according to the magnitude of the vibration of the visual information output parts 110, 210 and 310 caused by the manipulation and touch of the visual-haptic variable buttons 100, 200 and 300. For example, the visual information output parts 110, 210 and 310 adaptively change the shapes, sizes, and colors of the button icons according to the magnitude of the vibration, thereby providing various types of visual information.

The visual-haptic variable buttons 100, 200 and 300 in accordance with the embodiment of the present invention may be provided in a single or plural number in order to provide visual-haptic information, in other words, may be provided in an electronic apparatus in a single or plural number to adaptively change and provide visual-haptic information (e.g., a button icon, a sense of button manipulation, and a sense of button touch) according to the input of information when the electronic apparatus is used by a user, for example, the manipulation and touch of the visual-haptic variable buttons 100, 200 and 300. That is, a single visual-haptic button or a plurality of visual-haptic buttons may be provided in the electronic apparatus. Hereinafter, a realization example of a visual-haptic variable button in accordance with the embodiment of the present invention will be described in more detail with reference to FIGS. 5 and 6.

Figure 5:
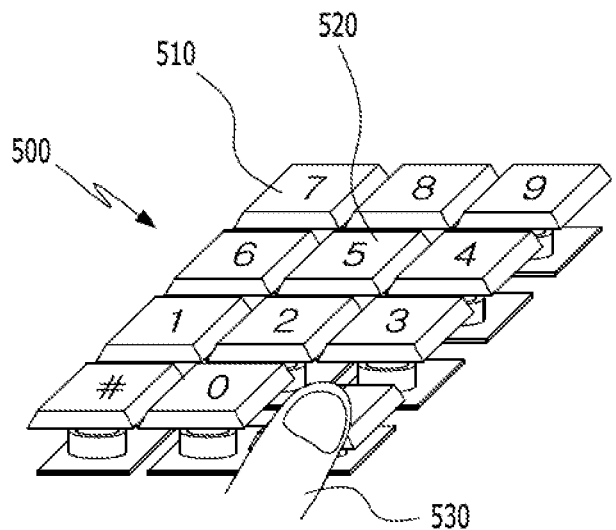
FIGS. 5 and 6 are diagrams explaining a realization example of a visual-haptic variable button in accordance with an embodiment of the present invention.
Figure 6:
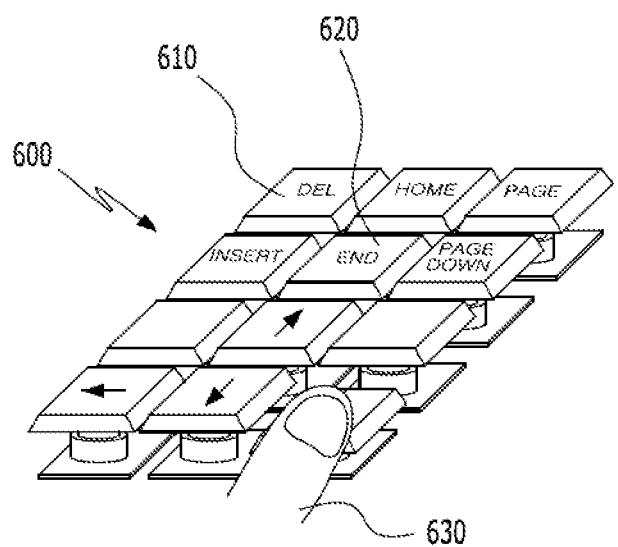

FIGS. 5 and 6 are diagrams explaining the realization of a visual-haptic variable button in accordance with an embodiment of the present invention. FIGS. 5 and 6 illustrate an example in which a plurality of visual-haptic variable buttons as described in FIGS. 1 to 4 are realized, which are diagrams illustrating an example in which a plurality of visual-haptic variable buttons are realized in a keyboard.

Referring to FIGS. 5 and 6, keyboards 500 and 600 are provided with a plurality of visual-haptic variable buttons 510 and 520, and 610 and 620, respectively. As illustrated in FIG. 5, when the keyboard 500 is used in an electronic apparatus in order to input numeral information, the plurality of visual-haptic variable buttons provided in the keyboard 500 provide visual information by outputting button icons indicating 0 to 9. For example, the visual-haptic variable button 510 provides visual information by outputting a button icon indicating 7, and the visual-haptic variable button 520 provides visual information by outputting a button icon indicating 5.

At this time, when inputting numeral information through a random button of the plurality of visual-haptic variable buttons 510 and 520 provided in the keyboard 500, that is, when manipulating and touching the random button, it is possible to provide various types of haptic information by adaptively changing a sense of button manipulation and a sense of button touch according to the manipulation and touch as described above while providing various types of visual information by adaptively changing the shapes, sizes, and colors of button icons according to the manipulation and touch. Since a change in the sense of button manipulation, the sense of button touch, and the button icon according to the manipulation and touch of the visual-haptic variable button, and the provision of various types of visual-haptic information through such a change have been described in detail above, detailed description thereof will be omitted.

As illustrated in FIG. 5, while the keyboard 500 is being used in order to input numeral information to an electronic apparatus, when a user manipulates and touches a random button in order to input document information through the keyboard 500 (refer to reference numeral 530), the keyboard 500 being used in order to input the numeral information is changed to a keyboard 600 for inputting the document information. That is, when the user manipulates and touches the random button in order to input the document information (refer to reference numeral 530), a plurality of visual-haptic variable buttons provided in the keyboard 600 in order to input the document information to the electronic apparatus output button icons indicating the input of document information, for example, a document edition function.

In other words, when the keyboard 600 is used in order to input the document information to the electronic apparatus, for example, used for document edition, through the manipulation and touch for the input of document information (refer to reference numeral 530), the plurality of visual-haptic variable buttons provided in the keyboard 600 output button icons indicating the document edition function. For example, the visual-haptic variable button 510 is changed from the button icon indicating 7 to a button icon indicating DEL, and the visual-haptic variable button 520 is changed from the button icon indicating 5 to a button icon indicating END. That is, in the keyboard 600, the visual-haptic variable button 610 adaptively outputs the button icon indicating the DEL to provide visual information, and the visual-haptic variable button 620 adaptively outputs the button icon indicating the END to provide visual information. In addition, it is possible to provide haptic information by adaptively changing the sense of button touch and the button icon according to the manipulation and touch for the input of document information (refer to reference numeral 530).

At this time, when inputting document information through a random button of the plurality of visual-haptic variable buttons 610 and 620 provided in the keyboard 600, that is, when manipulating and touching the random button, it is possible to provide various types of haptic information by adaptively changing a sense of button manipulation, and a sense of button touch according to the manipulation and touch as described above while providing various types of visual information by adaptively changing the shapes, sizes, and colors of button icons according to the manipulation and touch. Since a change in the sense of button manipulation, the sense of button touch, and the button icon according to the manipulation and touch of the visual-haptic variable button, and the provision of various types of visual-haptic information through such a change have been described in detail above, detailed description thereof will be omitted.

As with the case in which a user manipulates and touches a random button in order to input document information through the keyboard 500 (refer to reference numeral 530) while the keyboard 500 is being used in order to input numeral information to an electronic apparatus, when the user manipulates and touches a random button in order to input numeral information or other types of information through the keyboard 600 while the keyboard 600 is being used in order to input document information to the electronic apparatus (refer to reference numeral 630), the plurality of visual-haptic variable buttons provided in the keyboard 600 provide visual information by adaptively outputting button icons representing functions of inputting the numeral information or other types of information according to the manipulation and touch (refer to reference numeral 630) while providing haptic information by adaptively changing a sense of button manipulation and a sense of button touch according to the manipulation and touch of the random button for inputting the numeral information or other types of information (refer to reference numeral 630).

Furthermore, as the plurality of visual-haptic variable buttons provided in the keyboards 500 and 600 provide haptic information as the sense of button manipulation and the sense of button touch through the vibration of buttons, buttons (e.g., the visual-haptic variable buttons 520 and 620) positioned at the center of the keyboards 500 and 600 among the plurality of visual-haptic variable buttons provided in the keyboards 500 and 600 are recognized by a user through haptic information. For example, the user recognizes the visual-haptic variable buttons 520 and 620, which are the center buttons of the keyboards 500 and 600, through only the haptic information, and uses the keyboards 500 and 600 more easily. That is, when a user touches the visual-haptic variable buttons 520 and 620, the plurality of visual-haptic variable buttons provided in the keyboards 500 and 600 provide the user with haptic information through the vibration of the buttons to allow the user to recognize that the user is currently touching the visual-haptic variable buttons 520 and 620 positioned at the center of the keyboards 500 and 600, so that the user uses the keyboards 500 and 600 more easily and actively. Hereinafter, a visual-haptic variable button in accordance with another embodiment of the present invention will be described in more detail with reference to FIGS. 7 to 10.

Figure 7:
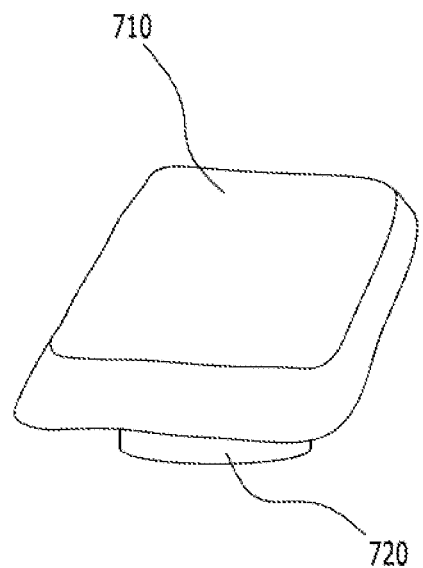
FIGS. 7 to 10 are diagrams explaining a visual-haptic variable button in accordance with another embodiment of the present invention.
Figure 8:
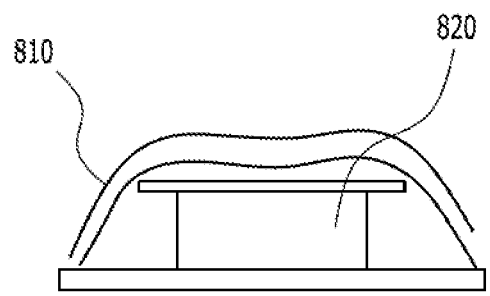
Figure 9:
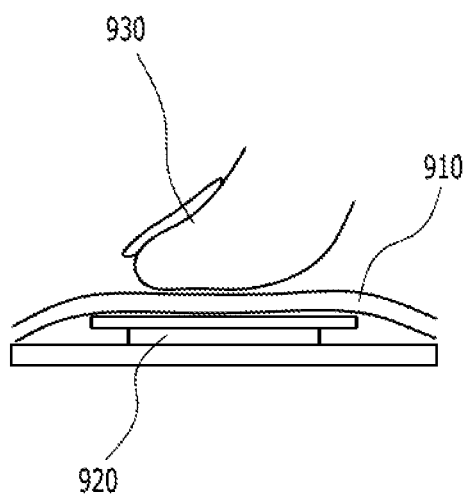
Figure 10:
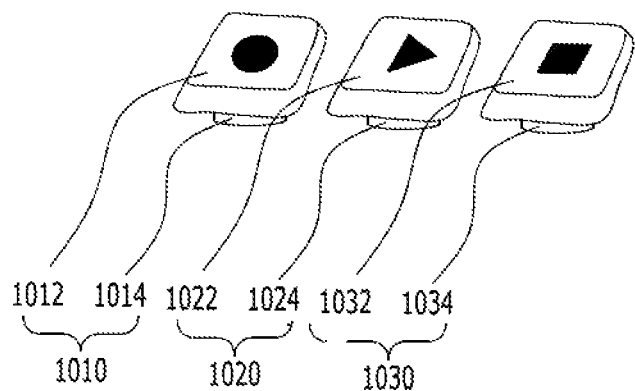

FIGS. 7 to 10 are diagrams explaining a visual-haptic variable button in accordance with another embodiment of the present invention. FIG. 7 is a perspective view illustrating the structure of the visual-haptic variable button, FIG. 8 is a sectional view illustrating the structure of the visual-haptic variable button, FIG. 9 is a sectional view illustrating the structure of the visual-haptic variable button when information is input through the visual-haptic variable button, and FIG. 10 is a diagram illustrating an example in which a plurality of visual-haptic variable buttons are provided.

Referring to FIGS. 7 to 10, visual-haptic variable buttons 1010, 1020 and 1030 include visual information output parts 710, 810, 1012, 1022 and 1032 for outputting button icons to provide visual information, and haptic information output parts 720, 820, 920, 1014, 1024 and 1034 for providing haptic information through a sense of button manipulation and a sense of button touch.

The visual information output parts 710, 810, 1012, 1022 and 1032 output the button icons to provide the visual information, include display elements, and are positioned at the outermost or uppermost portions of the visual-haptic variable buttons 1010, 1020 and 1030. The display elements used for the visual information output parts 710, 810, 1012, 1022 and 1032 are formed of a high molecular weight material with flexibility, for example, polymer.

The visual information output parts 710, 810, 1012, 1022 and 1032 formed of the high molecular weight material with flexibility are provided in the form of further thin films as compared with the visual information output parts 110, 210 and 310 of the visual-haptic variable buttons 100, 200 and 300 described in FIGS. 1 to 3. That is, as the visual-haptic variable buttons 1010, 1020 and 1030 including the visual information output parts 710, 810, 1012, 1022 and 1032 formed of the high molecular weight material with flexibility are provided in the form of thin films, they are used as thin film buttons, keypads and the like in an electronic apparatus.

In addition, the visual information output parts 710, 810, 1012, 1022 and 1032 accurately map the functional meanings of buttons to be used for the accurate input of information according to the purposes of electronic apparatuses or software or program driven in the electronic apparatuses, thereby outputting button icons. For example, when thin film buttons or keypads are provided in the form of the plurality of visual-haptic variable buttons 1010, 1020 and 1030 as illustrated in FIG. 10, the visual-haptic variable buttons 1010, 1020 and 1030 output corresponding button icons to display various types of button icons, thereby providing visual information.

Here, the visual information output parts 710, 810, 1012, 1022 and 1032 may be provided at the upper portion thereof with transparent sensors (not illustrated) for measuring contact or contact force of the visual-haptic variable buttons 1010, 1020 and 1030 caused by the manipulation or touch of a user when the user manipulates or touches the visual-haptic variable buttons 1010, 1020 and 1030 for the input of information (refer to reference numeral 930). Furthermore, when the user manipulates or touches the visual-haptic variable buttons 1010, 1020 and 1030 in order to input information (refer to reference numeral 930), the visual information output parts 710, 810, 1012, 1022 and 1032 change and output button icons according to the manipulation or touch. That is, the visual information output parts 710, 810, 1012, 1022 and 1032 adaptively change and output button icons according to the manipulation or touch of the visual-haptic variable buttons 1010, 1020 and 1030, thereby providing various types of visual information.

The haptic information output parts 720, 820, 920, 1014, 1024 and 1034 move the visual information output parts 710, 810, 1012, 1022 and 1032 according to the manipulation or touch of the visual-haptic variable buttons 1010, 1020 and 1030. The haptic information output parts 720, 820, 920, 1014, 1024 and 1034 include a motor, a piezoelectric material and the like, which generate a mechanical signal of displacement or force according to an electrical signal, and may have a pressure sensor (not illustrated) or a displacement sensor (not illustrated) therein.

When the user manipulates or touches the visual-haptic variable buttons 1010, 1020 and 1030 for the input of information (refer to reference numeral 930), the haptic information output parts 720, 820, 920, 1014, 1024 and 1034 move the visual information output parts 710, 810, 1012, 1022 and 1032 according to the contact or contact force of the visual-haptic variable buttons 1010, 1020 and 1030, which is caused by the manipulation or touch of the user, respectively. At this time, the haptic information output parts 720, 820, 920, 1014, 1024 and 1034 generate vibration or vertical displacement of the visual information output parts 710, 810, 1012, 1022 and 1032 according to the contact or contact force of the visual-haptic variable buttons 1010, 1020 and 1030, thereby allowing the visual information output parts 710, 810, 1012, 1022 and 1032 to vibrate or moving the visual information output parts 710, 810, 1012, 1022 and 1032 in the vertical direction, respectively.

That is, the visual information output parts 710, 810, 1012, 1022 and 1032 and the haptic information output parts 720, 820, 920, 1014, 1024 and 1034 of the visual-haptic variable buttons 1010, 1020 and 1030 adaptively change the button icons, the sense of button manipulation, and the sense of button touch according to the input of information to the electronic apparatus, for example, according to the contact or contact force of the visual-haptic variable buttons 1010, 1020 and 1030 as described above, thereby providing various types of visual information and haptic information. Since the provision of the visual information and haptic information has been described in detail with reference to FIGS. 1 to 4, detailed description thereof will be omitted. In addition, devices (e.g., thin film buttons or keypads) for inputting information to an electronic apparatus include the plurality of visual-haptic variable buttons 1010, 1020 and 1030 as illustrated in FIG. 10, wherein the plurality of visual-haptic variable buttons 1010, 1020 and 1030 adaptively change the button icons, the sense of button manipulation, and the sense of button touch according to the input of information to the electronic apparatus as described in FIGS. 5 and 6, thereby providing various types of visual-haptic information. Hereinafter, a visual-haptic variable button in accordance with another embodiment of the present invention will be described in more detail with reference to FIGS. 11 to 14.

Figure 11:
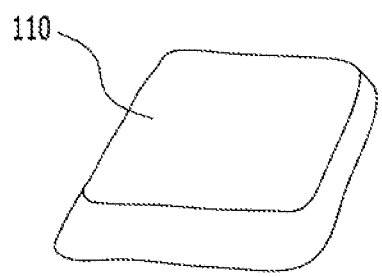
FIGS. 11 to 14 are diagrams explaining a visual-haptic variable button in accordance with further another embodiment of the present invention.
Figure 12:
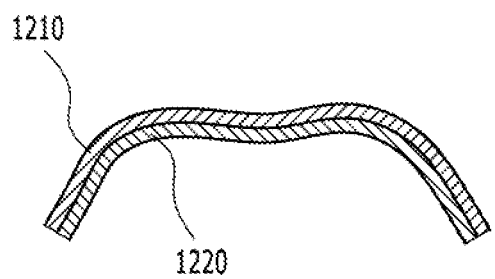
Figure 13:
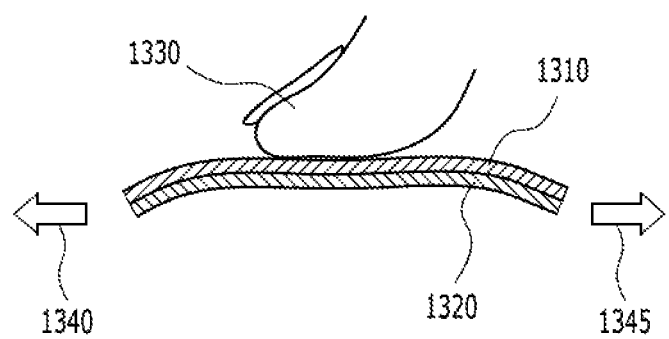
Figure 14:
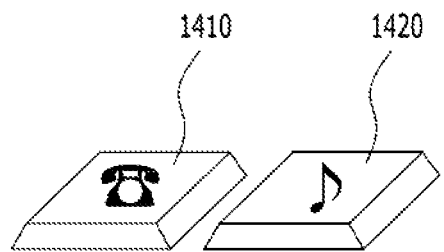

FIGS. 11 to 14 are diagrams explaining a visual-haptic variable button in accordance with another embodiment of the present invention. FIG. 11 is a perspective view illustrating the structure of the visual-haptic variable button, FIG. 12 is a sectional view illustrating the structure of the visual-haptic variable button, FIG. 13 is a sectional view illustrating the structure of the visual-haptic variable button when information is input through the visual-haptic variable button, and FIG. 14 is a diagram illustrating an example in which a plurality of visual-haptic variable buttons are provided.

Referring to FIGS. 11 to 14, visual-haptic variable buttons 1110, 1410 and 1420 include visual information output parts 1210 and 1310 for outputting button icons to provide visual information, and haptic information output parts 1220 and 1320 for providing haptic information through a sense of button manipulation and a sense of button touch.

The visual information output parts 1210 and 1310 output the button icons to provide the visual information, include display elements, and are positioned at the outermost or uppermost portions of the visual-haptic variable buttons 1110, 1410 and 1420. The display elements used for the visual information output parts 1210 and 1310 are formed of a high molecular weight material with flexibility, for example, polymer.

The visual information output parts 1210 and 1310 formed of the high molecular weight material with flexibility are provided in the form of further thin films as compared with the visual information output parts 110, 210 and 310 of the visual-haptic variable buttons 100, 200 and 300 described in FIGS. 1 to 3. That is, as the visual-haptic variable buttons 1110, 1410 and 1420 including the visual information output parts 1210 and 1310 formed of the high molecular weight material with flexibility are provided in the form of thin films, they are used as thin film buttons, keypads and the like in an electronic apparatus.

In addition, the visual information output parts 1210 and 1310 accurately map the functional meanings of buttons to be used for the accurate input of information according to the purposes of electronic apparatuses or software or program driven in the electronic apparatuses, thereby outputting button icons. For example, when thin film buttons or keypads are provided in the form of the plurality of visual-haptic variable buttons 1410 and 1420 as illustrated in FIG. 14, the visual-haptic variable buttons 1410 and 1420 output corresponding button icons to display various types of button icons, thereby providing visual information.

Here, the visual information output parts 1210 and 1310 may be provided at the upper portion thereof with transparent sensors (not illustrated) for measuring contact or contact force of the visual-haptic variable buttons 1110, 1410 and 1420 caused by the manipulation or touch of a user when the user manipulates or touches the visual-haptic variable buttons 1110, 1410 and 1420 for the input of information (refer to reference numeral 1330). Furthermore, when the user manipulates or touches the visual-haptic variable buttons 1110, 1410 and 1420 in order to input information (refer to reference numeral 1330), the visual information output parts 1210 and 1310 change and output button icons according to the manipulation or touch. That is, the visual information output parts 1210 and 1310 adaptively change and output button icons according to the manipulation or touch of the visual-haptic variable buttons 1110, 1410 and 1420, thereby providing various types of visual information.

The haptic information output parts 1220 and 1320 are formed of polymer (a material with a high molecular weight) similarly to the visual information output parts 1210 and 1310. Specifically, the polymer in the haptic information output parts 1220 and 1320 includes an electro-active high molecular weight material which may be deformed according to the manipulation or touch of the visual-haptic variable buttons 1110, 1410 and 1420. The electro-active high molecular weight material includes cellulose, electro-active polymer (hereinafter, referred to as an "EAP"), and the like. Therefore, the haptic information output parts 1220 and 1320 move the visual information output parts 1210 and 1310 according to the manipulation or touch of the visual-haptic variable buttons 1110, 1410 and 1420.

Here, when the user manipulates or touches the visual-haptic variable buttons 1110, 1410 and 1420 for the input of information (refer to reference numeral 1330), the haptic information output parts 1220 and 1320 move the visual information output parts 1210 and 1310 according to the contact or contact force of the visual-haptic variable buttons 1110, 1410 and 1420, which is caused by the manipulation or touch of the user. At this time, as the haptic information output parts 1220 and 1320 are formed of the electro-active high molecular weight material which may be deformed as described above, the haptic information output parts 1220 and 1320 are deformed according to the contact or contact force of the visual-haptic variable buttons 1110, 1410 and 1420, that is, move in such a manner that displacement in the vertical direction of the haptic information output parts 1220 and 1320 is reduced and the length in the horizontal direction of the haptic information output parts 1220 and 1320 is increased (refer to reference numerals 1340 and 1345). Therefore, with the movement (refer to reference numerals 1340 and 1345) of the haptic information output parts 1220 and 1320, the visual information output parts 1210 and 1310 directly move in such a manner that displacement in the vertical direction of the visual information output parts 1210 and 1310 is reduced and the length in the horizontal direction of the visual information output parts 1210 and 1310 is increased. That is, the vertical direction displacement is directly generated, so that the visual information output parts 1210 and 1310 move in the horizontal direction.

In this way, the visual information output parts 1210 and 1310 and the haptic information output parts 1220 and 1320 of the visual-haptic variable buttons 1110, 1410 and 1420 are formed of the high molecular weight material with flexibility, in other words, a flexible display material is combined with a flexible haptic material to form the visual-haptic variable buttons 1110, 1410 and 1420, so that thin film buttons can be realized and the visual-haptic variable buttons 1110, 1410 and 1420 can be used in a wide range of electronic apparatuses such as portable terminals. Furthermore, the visual information output parts 1210 and 1310 and the haptic information output parts 1220 and 1320 of the visual-haptic variable buttons 1110, 1410 and 1420 provide various types of visual information and haptic information by adaptively changing the button icons, the sense of button manipulation and the sense of button touch according to the input of information to the electronic apparatus as described above, in other words, the manipulation and touch of the visual-haptic variable buttons 1110, 1410 and 1420. Since the provision of the visual information and haptic information has been described in detail with reference to FIGS. 1 to 4, detailed description thereof will be omitted. In addition, devices (e.g., thin film buttons or keypads) for inputting information to an electronic apparatus include the plurality of visual-haptic variable buttons 1410 and 1420 as illustrated in FIG. 14, wherein the plurality of visual-haptic variable buttons 1410 and 1420 adaptively change the button icons, the sense of button manipulation, and the sense of button touch according to the input of information to the electronic apparatus as described in FIGS. 5 and 6, thereby providing various types of visual-haptic information. Hereinafter, the operation of the haptic information output part for outputting haptic information in the visual-haptic variable button in accordance with an embodiment of the present invention will be described in more detail with reference to FIG. 15.

Figure 15:
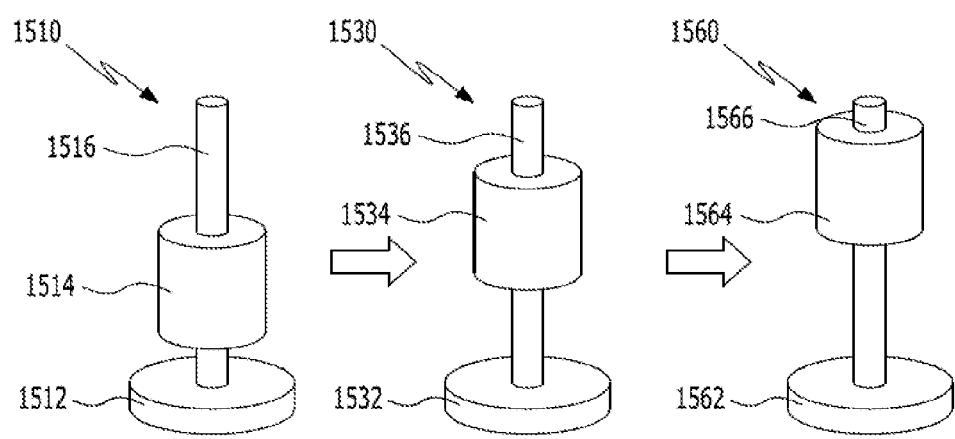
FIG. 15 is a diagram explaining the operation of a haptic information output part of a visual-haptic variable button in accordance with an embodiment of the present invention.

FIG. 15 is a diagram explaining the operation of the haptic information output part of the visual-haptic variable button in accordance with the embodiment of the present invention.

Referring to FIG. 15, the haptic information output part includes a plurality of small haptic elements arranged in order to provide the sense of button manipulation and the sense of button touch as haptic information as described above according to the input of information through the visual-haptic variable button, in other words, according to the manipulation or touch of the visual-haptic variable button, the visual information output part move in the vertical direction or vibrates by the plurality of small haptic elements, and the sense of button manipulation and the sense of button touch are provided as the haptic information according to the manipulation or touch of the visual-haptic variable button. Furthermore, each small haptic element includes a linear actuator, and FIG. 15 is a diagram schematically illustrating the linear actuators of the small haptic elements arranged in the haptic information output parts.

In more detail, linear actuators 1510, 1530 and 1560 have a small ultrasonic liner actuator structure used in the small haptic elements of the haptic information output parts for providing the sense of button manipulation and the sense of button touch as the haptic information according to the manipulation or touch of the visual-haptic variable buttons. That is, the small haptic elements include the linear actuators 1510, 1530 and 1560 with the small ultrasonic liner actuator structure, respectively.

The linear actuators 1510, 1530 and 1560 include disk-type transducers 1512, 1532 and 1562, movable shafts 1516, 1536 and 1566, and movers 1514, 1534 and 1564, respectively. The movable shafts 1516, 1536 and 1566 are connected to the transducers 1512, 1532 and 1562, and slightly move in the vertical direction as disks of the transducers 1512, 1532 and 1562 are repeatedly deformed into concave and convex shapes, respectively. The movers 1514, 1534 and 1564 surround the movable shafts 1516, 1536 and 1566, and move together with the movable shafts 1516, 1536 and 1566 or move separately from the movable shafts 1516, 1536 and 1566 as the movable shafts 1516, 1536 and 1566 slightly move in the vertical direction, respectively.

The transducers 1512, 1532 and 1562 may include disk-type transducers based on the bimorph principle, and include a piezoelectric material which quickly reacts to a potential difference to generate displacement. In other words, the disks of the transducers 1512, 1532 and 1562 are very quickly deformed into concave and convex shapes by a potential difference in a repetitive manner, resulting in the generation of displacement due to the repetitive deformation.

The movable shafts 1516, 1536 and 1566 are connected to the transducers 1512, 1532 and 1562 to slightly reciprocate in the vertical direction as the disks of the transducers 1512, 1532 and 1562 are repeatedly deformed into concave and convex shapes, respectively. In other words, the movable shafts 1516, 1536 and 1566 slightly move in the vertical direction, starting from the linear actuator 1510 in a first state to the linear actuator 1520 in a second state and the linear actuator 1530 in a third state as the disks of the transducers 1512, 1532 and 1562 are repeatedly deformed into the concave and convex shapes.

The movers 1514, 1534 and 1564 surround the movable shafts 1516, 1536 and 1566, and move together with the movable shafts 1516, 1536 and 1566 in the vertical direction or move separately from the movable shafts 1516, 1536 and 1566 in the vertical direction as the movable shafts 1516, 1536 and 1566 slightly move in the vertical direction. In other words, the movers 1514, 1534 and 1564 slightly move in the vertical direction, starting from the linear actuator 1510 in the first state to the linear actuator 1520 in the second state and the linear actuator 1530 in the third state as the movable shafts 1516, 1536 and 1566 slightly move in the vertical direction. With the movement in the vertical direction, the sense of button manipulation and the sense of button touch are adaptively changed according to the manipulation and touch of the visual-haptic variable buttons, so that various types of haptic information is provided.

When the movement speeds of the movable shafts 1516, 1536 and 1566 are low, the movers 1514, 1534 and 1564 move together with the movable shafts 1516, 1536 and 1566, respectively. However, when the movement speeds of the movable shafts 1516, 1536 and 1566 are high, the movers 1514, 1534 and 1564 come in sliding contact with the movable shafts 1516, 1536 and 1566, respectively.

Therefore, in the state in which the movable shafts 1516, 1536 and 1566 are fixed, the positions of the movers 1514, 1534 and 1564 of the linear actuators 1510, 1530 and 1560 may be slightly changed according to an instantaneous operation of the transducers 1512, 1532 and 1562, that is, as the transducers 1512, 1532 and 1562 are deformed into the concave and convex shapes. The transducers 1512, 1532 and 1562 are formed of a piezoelectric material, such as piezoelectric ceramic or piezoelectric polymer, which very quickly reacts to an electrical signal, and may operate even at a frequency of several tens of KHz or more. Therefore, even when the transducers 1512, 1532 and 1562 operate at a high frequency, the movers 1514, 1534 and 1564 may be moved in a desired direction by several tens of millimeters or more per second. For example, as the transducers 1512, 1532 and 1562 are deformed into the concave and convex shapes, the movable shafts 1516, 1536 and 1566 vertically move to the positions on the linear actuator 1510 in the first state, the linear actuator 1520 in the second state, and the linear actuator 1530, and the movers 1514, 1534 and 1564 move along the movable shafts 1516, 1536 and 1566.

Furthermore, the linear actuators 1510, 1530 and 1560 are ultrasonic linear actuators as described above, and operate even at a frequency corresponding to a ultrasonic range as well as the audible frequency of 20 KHZ, thereby providing various types of sense of button manipulation and sense of button touch according to the manipulation and touch of the visual-haptic variable buttons even at the frequency corresponding to the ultrasonic range as well as the audible frequency. The linear actuators 1510, 1530 and 1560 may use all linear actuators in which the movers 1514, 1534 and 1564 move along the movable shafts 1516, 1536 and 1566, as well as the ultrasonic linear actuators.

The linear actuators 1510, 1530 and 1560 have a small size and do not generate a noise. Furthermore, due to the small power consumption, a plurality of the linear actuators are simultaneously used to cause various types of deformation, thereby generating haptic information, that is, providing various types of sense of button manipulation and sense of button touch. In addition, in the linear actuators 1510, 1530 and 1560, displacement occurs as the transducers 1512, 1532 and 1562 are deformed into the concave and convex shapes according to the manipulation and touch of the visual-haptic variable buttons, so that the movable shafts 1516, 1536 and 1566 and the movers 1514, 1534 and 1564 move in the vertical direction, and thus the visual information output parts move in the vertical direction or vibrate.

That is, the linear actuators 1510, 1530 and 1560 provided in the plurality of haptic elements of the haptic information output parts provide various types of haptic information by adaptively outputting the sense of button manipulation and the sense of button touch according to the input of information to the electronic apparatus through the visual-haptic variable buttons, in other words, according to the manipulation and touch of the visual-haptic variable buttons. In addition, the visual information output parts provide visual information by adaptively outputting various types of button icons according to the sense of button manipulation and the sense of button touch corresponding to the manipulation and touch of the visual-haptic variable buttons. Hereinafter, an apparatus for providing visual-haptic information through the visual-haptic variable button in accordance with the embodiment of the present invention will be described in more detail with reference to FIG. 16.

Figure 16:
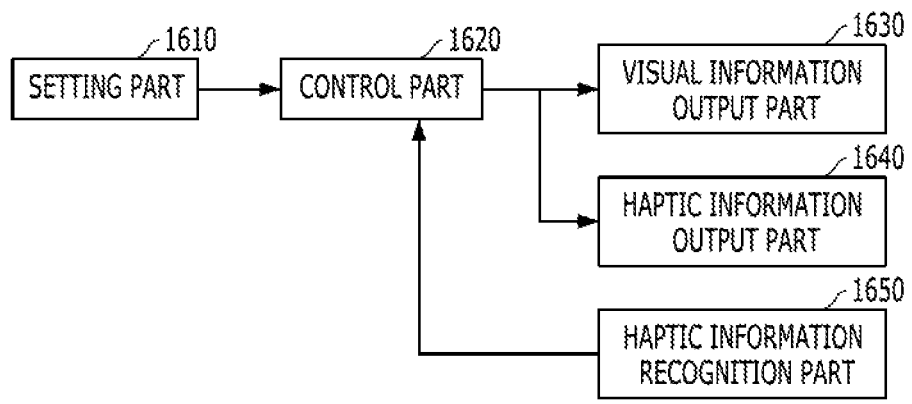
FIG. 16 is a diagram schematically illustrating the structure of a visual-haptic information providing apparatus in accordance with an embodiment of the present invention.

FIG. 16 is a diagram schematically illustrating the structure of a visual-haptic information providing apparatus.

Referring to FIG. 16, the visual-haptic information providing apparatus adaptively changes the button icons, the sense of button manipulation, and the sense of button touch according to the input of information to the electronic apparatus through the visual-haptic variable buttons as described above, in other words, according to the manipulation and touch of the visual-haptic variable buttons based on the purposes of the visual-haptic variable buttons, thereby proving various types of visual-haptic information. The visual-haptic information providing apparatus may be the visual-haptic variable button or included in the visual-haptic variable button.

In more detail, the visual-haptic information providing apparatus for providing visual-haptic information through the visual-haptic variable button provided in the electronic apparatus as described above includes a setting part 1610, a control part 1620, a visual information output part 1630, a haptic information output part 1640, and a haptic information recognition part 1650. The setting part 1610 sets information of the visual-haptic variable button. The control part 1620 controls and sets the visual-haptic information to be provided through the visual-haptic variable button according to button information (or button setup information) set by the setting part 1610, for example, a button setup command. The visual information output part 1630 outputs visual information, for example, button icons, under the control and setting of the control part 1620. The haptic information output part 1640 outputs haptic information, for example, a sense of button manipulation, and a sense of button touch, under the control and setting of the control part 1620. The haptic information recognition part 1650 recognizes the manipulation and touch of the visual-haptic variable button by a user, in other words, haptic information according to the input of information.

In order to adaptively provide various types of visual-haptic information according to the input of information through the visual-haptic variable button according to the purposes of the visual-haptic variable button provided in the electronic apparatus, in other words, according to the manipulation and touch of the visual-haptic variable button, the setting part 1610 sets the information of the visual-haptic variable button. Then, the setting part 1610 outputs the button information based on the setting to the control part 1620 as the button setup command. The button information includes information on a button size and a button size as layout information of the visual-haptic variable button. Furthermore, when a plurality of visual-haptic variable buttons are provided in the electronic apparatus as described above, the button information includes button attribute information of the plurality of visual-haptic variable buttons, wherein the button attribute information includes icon image information according to a button state, output force function information, button state information, a button state critical value, information on the initial heights of buttons, and the like.

The icon image information according to a button state includes images for inputting numerals, the Korean alphabet, English characters, special characters and the like, software or program being driven in an electronic apparatus, for example, images for function keys to be used in a game, and the like, according to the purposes of the visual-haptic variable button provided in the electronic apparatus. The output force function information includes an output function between a force outputting height and force according to the vertical movement of the visual information output part, i.e., a change in the height of the visual information output part, in correspondence with contact or contact force of the visual-haptic variable button based on the manipulation and touch of the visual-haptic variable button as described above.

The output function between the height and the force may be expressed by the graph illustrated in FIG. 4. That is, the output function between the height and the force is a function for determining a sense of button manipulation and a sense of button touch based on the manipulation and touch of the visual-haptic variable button as described above. With the manipulation and touch of the visual-haptic variable button, the height of the visual-haptic variable button is changed, so that a sense of button manipulation and a sense of button touch for pressing and unpressing are provided as the sense of button manipulation and the sense of button touch according to a change in the height. For example, a step-by-step button event is generated according to a button with feeling of lightness and a button with feeling of heaviness at the time of pressing of the visual-haptic variable button, or the heights of buttons, so that the sense of button manipulation and the sense of button touch (i.e., the haptic information) are provided. The button event includes a touch event, a pressing event, a click event and the like.

Furthermore, the button state information includes information on the step-by-step button event according to the heights of the buttons as described above, and includes information on an idle state, a touch state (i.e., a touch event), a pressed state (i.e., a pressing event), a click state (i.e., a click event) and the like, according to the heights of the buttons based on the manipulation and touch of the visual-haptic variable button. The touch event as the touch state represents the state in which a user makes contact with the visual-haptic variable button, the pressing event as the pressed state represents the state in which the user presses the visual-haptic variable button, for example, the visual information output part moves down to the depth x1 in the vertical direction. Furthermore, the click event as the click state represents the state in which the user presses the visual-haptic variable button up to the maximum depth, for example, the visual information output part moves down to the maximum depth beyond the depth x1 (410) in the vertical direction.

The button state critical value includes a critical value for a touch state, a pressed state and a click state of the visual-haptic variable button, that is, a touch state critical value, a pressed state critical value, and a click state critical value. When the visual-haptic variable button is in an idle state, the haptic elements provide in the visual-haptic variable button may have initially set heights according to the information on the initial heights of buttons.

The control part 1620 controls visual-haptic information to be provided through the visual information output part 1630 and the haptic information output part 1640 according to the button information. In more detail, the control part 1620 receives the button information from the setting part 1610 as described above, and sets and controls the visual information output part 1630 to adaptively output various types of button icons as visual information by using the button information according to the manipulation and touch of the visual-haptic variable button. Here, the control part 1620 generates setting information on visual information, for example, button icon information, and outputs the setting information to the visual information output part 1630 such that the visual information output part 1630 outputs various types of button icons to provide visual information.

Furthermore, the control part 1620 sets and controls the haptic information output part 1640 to adaptively output various types of haptic information, for example, a sense of button manipulation and a sense of button touch, as haptic information by using the button information according to the manipulation and touch of the visual-haptic variable button. Here, the control part 1620 generates setting information on haptic information, for example, information on the height and force of buttons, and outputs the haptic information to the haptic information output part 1640 such that the haptic information output part 1640 outputs the sense of button manipulation and the sense of button touch to provide haptic information. Furthermore, the control part 1620 controls and sets the haptic information recognition part 1650 to recognize the input of information through the visual-haptic variable button according to the purposes of the electronic apparatus, in other words, the manipulation and touch of the visual-haptic variable button, and the visual information output part 1630 and the haptic information output part 1640 to adaptively provide various types of visual-haptic information according to the recognized input of information, that is, the button manipulation. That is, the control part 1620 controls the visual information output part 1630 and the haptic information output part 1640 to adaptively change the button icon, the sense of button manipulation, and the sense of button touch according to the manipulation and touch of the visual-haptic variable button for inputting information to the electronic apparatus through the visual-haptic variable button, thereby proving various types of visual-haptic information. To this end, the control part 1620 generates setting information on the visual-haptic information and outputs the setting information to the visual information output part 1630 and the haptic information output part 1640.

The visual information output part 1630 receives the setting information on visual information from the control part 1620 as described above, and outputs visual information through the received setting information, in other words, the button icon, thereby providing visual information. The visual information output part 1630 moves in the vertical direction or vibrates by the haptic information output part 1640 according to the manipulation and touch of the visual-haptic variable button. Since the operation of the visual information output part 1630 has been described in detail above, detailed description thereof will be omitted.

The haptic information output part 1640 receives the setting information on haptic information from the control part 1620 as described above, and outputs haptic information through the received setting information, in other words, the sense of button manipulation and the sense of button touch, thereby providing haptic information. The haptic information output part 1640 moves the visual information output part 1630 in the vertical direction or allows the visual information output part 1630 to vibrate according to the manipulation and touch of the visual-haptic variable button. Since the operation of the haptic information output part 1640 has been described in detail above, detailed description thereof will be omitted.

In this way, the visual information output part 1630 and the haptic information output part 1640 provide various types of visual-haptic information by adaptively changing the button icon, the sense of button manipulation, and the sense of button touch according to the manipulation and touch of the visual-haptic variable button, thereby allowing a user to more easily input information to the electronic apparatus through the visual-haptic variable button. In addition, the visual information output part 1630 and the haptic information output part 1640 provide various types of visual information and haptic information, thereby allowing the user to use the electronic apparatus more actively.

As described above, the haptic information recognition part 1650 recognizes the input of information through the visual-haptic variable button, in other words, a change in the heights of the plurality of haptic elements provide in the visual-haptic variable button according to the manipulation and touch of the visual-haptic variable button, and outputs recognition information corresponding to the change in the heights of the plurality of haptic elements to the control part 1620. The recognition information includes output force function information corresponding to the button touch, the button pressing and the button click of the visual-haptic variable button, and information on the heights of the plurality of haptic elements. Furthermore, the haptic information recognition part 1650 detects the change in the heights of the plurality of haptic elements provided in the visual-haptic variable button by a predetermined number of times or more per a unit time in order to more accurately recognize the manipulation and touch of the visual-haptic variable button, and outputs recognition information corresponding to the detection to the control part 1620.

The control part 1620 receives the output force function information and the height information from the haptic information recognition part 1650, and calculates button force values according to the manipulation and touch of the visual-haptic variable button, and height values of the plurality of haptic elements by using the received output force function information and height information. Furthermore, the control part 1620 outputs the button force values and the height values of the plurality of haptic elements to the haptic information output part 1640, and controls the haptic information output part 1640 to provide various types of haptic information by adaptively changing haptic information according to the button force values and the height values of the plurality of haptic elements, that is, the sense of button manipulation and the sense of button touch. Under the control of the haptic information output part 1640, the visual information output part 1630 provides various types of visual information by adaptively changing visual information according to the button force values and the height values of the plurality of haptic elements, that is, the button icon.

Here, the control part 1620 receives the output force function information and the height information from the haptic information recognition part 1650 to check the current button state of the visual-haptic variable button, for example, an idle state, a touch state, a pressed state, and a click state, and allows the visual information output part 1630 and the haptic information output part 1640 to provide various types of visual-haptic information by adaptively changing the button icon, the sense of button manipulation, and the sense of button touch according to the checked button state. At this time, the control part 1620 compares the current height values of the plurality of haptic elements with the set button state critical value (i.e., the touch state critical value, the pressed state critical value, or the click state critical value), and checks the button state of the visual-haptic variable button.

As the haptic information recognition part 1650 detects the change in the heights of the plurality of haptic elements provided in the visual-haptic variable button by a predetermined number of times or more per a unit time in order to more accurately recognize the manipulation and touch of the visual-haptic variable button, and outputs the recognition information corresponding to the detection to the control part 1620 as described above, the control part 1620 controls the visual information output part 1630 to provide various types of visual information by adaptively changing the button icon according to the manipulation and touch of the visual-haptic variable button, and the haptic information output part 1640 to provide various types of haptic information by adaptively changing the sense of button manipulation and the sense of button touch according to the manipulation and touch of the visual-haptic variable button, by using the recognition information and the button information.

In other words, the control part 1620 calculates the output force value and the height values of the plurality of haptic elements through the output force function information and the height information included in the recognition information, compares the calculated output force value and height values with the button state critical value of the button setting information, changes the state of the visual-haptic variable button according to a comparison result, that is, generates a button event, and controls the visual information output part 1630 to provide a button icon adaptively changed according to the button event, that is, various types of visual information. Furthermore, the control part 1620 controls the haptic information output part 1640 to provide a sense of button manipulation and a sense of button touch adaptively changed according to the button event, that is, various types of haptic information. Hereinafter, an operation for providing visual-haptic information through the visual-haptic variable button in accordance with the embodiment of the present invention will be described in more detail with reference to FIG. 17.

Figure 17:
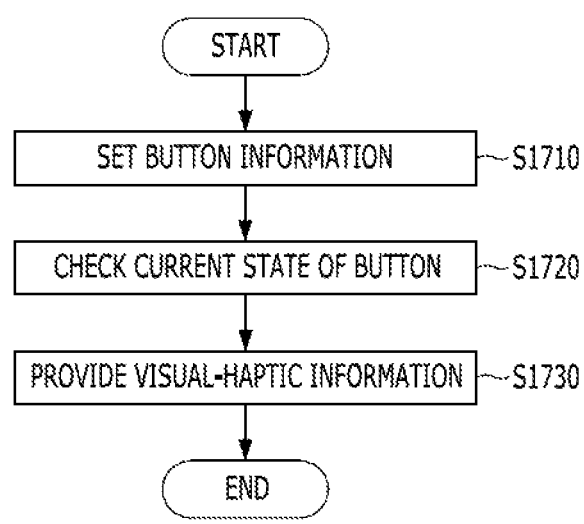
FIG. 17 is a diagram schematically illustrating the operation process in which a visual-haptic variable button in accordance with an embodiment of the present invention provides visual-haptic information.

FIG. 17 is a diagram schematically illustrating the operation process in which the visual-haptic variable button provides the visual-haptic information in accordance with the embodiment of the present invention.

Referring to FIG. 17, in step S1710, button information of the visual-haptic variable button is set according to the input of formation to an electronic apparatus through the visual-haptic variable button, in other words, the manipulation and touch of the visual-haptic variable button. The button information includes information on a button size and a button type as the layout information of the visual-haptic variable button, and button attribute information of a plurality of visual-haptic variable buttons, wherein the button attribute information includes icon image information according to a button state, output force function information, button state information, a button state critical value, information on the initial heights of buttons, and the like.

In step S1720, the current state of the visual-haptic variable button is checked. In more detail, the current heights of the plurality of haptic elements provided in the visual-haptic variable button are checked, the previous state and the current state of the visual-haptic variable button are compared with each other, that is, the previous heights and the current heights of the plurality of haptic elements are compared with each other, and the current output force and the button icon of the visual-haptic variable button are determined.

At this time, it is checked whether the current button state of the visual-haptic variable button is an idle state. When the current button state of the visual-haptic variable button is the idle state, a touch state critical value in the set button state critical value is compared with the current height. However, when the current button state of the visual-haptic variable button is not the idle state, it is checked whether the current button state of the visual-haptic variable button is a touch state. When the current button state of the visual-haptic variable button is the touch state, a pressed state critical value in the set button state critical value is compared with the current height. However, when the current button state of the visual-haptic variable button is not the touch state, it is checked whether the current button state of the visual-haptic variable button is a pressed state. When the current button state of the visual-haptic variable button is the pressed state, a click state critical value in the set button state critical value is compared with the current height. However, when the current button state of the visual-haptic variable button is not the pressed state, it is checked whether the current button state of the visual-haptic variable button is a click state. When the current button state of the visual-haptic variable button is the click state, the touch state critical value in the set button state critical value is compared with the current height.

According to a result obtained by comparing the set button state critical value with the current height, the previous state and the current state of the visual-haptic variable button are checked. When the previous state of the visual-haptic variable button is an idle state, the visual-haptic variable button maintains the idle state or is changed to a touch state. Furthermore, when the previous state of the visual-haptic variable button is a touch state, the visual-haptic variable button maintains the touch state or is changed to a pressed state. When the previous state of the visual-haptic variable button is a pressed state, the visual-haptic variable button maintains the pressed state or is changed to a click state. When the previous state of the visual-haptic variable button is a click state, the visual-haptic variable button maintains the click state or is changed to a touch state.

As described above, when the previous state and the current state of the visual-haptic variable button are different from each other and the state of the visual-haptic variable button is changed, that is, when the visual-haptic variable button is manipulated and touched in order to input information through the visual-haptic variable button, the button icon, the sense of button manipulation, and the sense of button touch are adaptively changed according to the manipulation and touch of the visual-haptic variable button, thereby providing various types of visual-haptic information in step S1730.

Here, a button icon changed in response to a change in the state of the visual-haptic variable button according to the manipulation and touch of the visual-haptic variable button is output, thereby providing visual information. At this time, when the state of the visual-haptic variable button is not changed, a button icon with a previous state is output as is to provide visual information. Force and height values of haptic elements changed through the output force function in response to the change in the state of the visual-haptic variable button according to the manipulation and touch of the visual-haptic variable button is output, that is, changed sense of button manipulation and sense of button touch are output, thereby providing haptic information.

So far, with reference to FIG. 17, the case in which the operation for providing the visual-haptic information is performed by the visual-haptic variable button has been described. However, the operation may be performed by a visual-haptic information providing apparatus or a visual-haptic variable button including the visual-haptic information providing apparatus, as well as the visual-haptic variable button. Furthermore, the visual-haptic variable button may serve as the visual-haptic information providing apparatus.

In accordance with the embodiment of the present invention, a button icon, a sense of button manipulation, and a sense of button touch are adaptively changed according to the purposes of a button already manufactured in order to input information to various types of electronic apparatuses, thereby providing various types of visual-haptic information according to the purposes of the button, and thus allowing a user to easily and actively use the electronic apparatuses.

While the present invention has been described with respect to the specific embodiments, it will be apparent to those skilled in the art that various changes and modifications may be made without departing from the spirit and scope of the invention as defined in the following claims.

What is claimed is:

1. A button for providing visual-haptic information, the button comprising:
    a visual-haptic variable button that adaptively provides various types of visual-haptic information according to input of information to an electronic apparatus,
    wherein the visual-haptic variable button comprises:
    a visual information output part that adaptively changes various types of button icons according to manipulation and touch of the visual-haptic variable button for the input of information, thereby outputting visual information; and
    a haptic information output part that adaptively changes various types of sense of button manipulation and sense of button touch according to the manipulation and touch of the visual-haptic variable button, thereby outputting haptic information,
    wherein at least one visual-haptic variable button is provided in the electronic apparatus for the input of information; and wherein the visual-haptic variable button provides the visual-haptic information through the visual information output part and the haptic information output part by using layout information including a button size, a button type, and button attribute information, the button attribute information including icon image information according to a button state, output force function information, button state information, a button state critical value, and information on an initial height of a button.

2. The button of claim 1, wherein the visual information output part is positioned at an outermost or uppermost portion of the visual-haptic variable button, and the haptic information output part is positioned under the visual information output part.

3. The button of claim 1, wherein the visual information output part includes a display element of an LCD panel or an LED panel, or is formed of a high molecular weight material with flexibility.

4. The button of claim 1, wherein the haptic information output part includes a motor or a piezoelectric material, which generates a mechanical signal of displacement or force according to an electrical signal, or an electro-active high molecular weight material which is deformed according to the manipulation and touch of the visual-haptic variable button.

5. The button of claim 1, wherein the haptic information output part moves the visual information output part in a vertical direction or allows the visual information output part to vibrate according to the manipulation and touch of the visual-haptic variable button, includes a plurality of haptic elements in order to move the visual information output part in the vertical direction or allow the visual information output part to vibrate, and heights of the plurality of haptic elements are changed according to the manipulation and touch of the visual-haptic variable button.

6. The button of claim 5, wherein the plurality of haptic elements are arranged in the haptic information output part according to a size of the visual-haptic variable button, and include linear actuators, which change the sense of button manipulation and the sense of button touch according to the manipulation and touch of the visual-haptic variable button, respectively.

7. The button of claim 6, wherein the linear actuator comprises:
a disk-type transducer repeatedly deformed into concave and convex shapes according to the manipulation and touch of the visual-haptic variable button;
a movable shaft that moves in the vertical direction as the transducer are repeatedly deformed into the concave and convex shapes; and
a mover that moves in the vertical direction as the movable shaft moves in the vertical direction,
wherein the heights of the plurality of haptic elements are changed according to vertical movement, resulting in a change in the sense of button manipulation and the sense of button touch.

8. The button of claim 5, wherein the haptic information output part outputs force increasing or decreasing at a predetermined rate according to degree of movement of the visual information output part, thereby changing the sense of button manipulation and the sense of button touch.

9. The button of claim 8, wherein, when the visual-haptic variable button is in a pressed state, the haptic information output part outputs force, by which the degree of movement increases up to a predetermined critical value at the predetermined rate, to output down-pressing with the sense of button manipulation and the sense of button touch, and outputs force decreasing up to a maximum value from the predetermined critical value at the predetermined rate to output maximum down-pressing with the sense of button manipulation and the sense of button touch.

10. The button of claim 8, wherein, when the visual-haptic variable button is in an unpressed state, the haptic information output part outputs force, by which the degree of movement increases up to a predetermined critical value at the predetermined rate, to output up-pressing with the sense of button manipulation and the sense of button touch.

11. The button of claim 5, wherein the visual information output part adaptively changes a shape, a size and a color of the button icon according to movement in the vertical direction or vibration, thereby outputting the visual information.

12. An apparatus for providing visual-haptic variable information through a visual-haptic variable button, the apparatus comprising:
a setting part that sets button information of the visual-haptic variable button;
a control part that outputs setting information on visual information and setting information on haptic information by using the button information;
a visual information output part that provides the visual information by using the setting information on visual information;
a haptic information output part that provides the haptic information by using the setting information on haptic information, wherein the haptic information output part moves the visual information output part in a vertical direction or allows the visual information output part to vibrate according to manipulation and touch of the visual-haptic variable button, includes a plurality of haptic elements in order to move the visual information output part in the vertical direction or allow the visual information output part to vibrate, and heights of the plurality of haptic elements are changed according to the manipulation and touch of the visual-haptic variable button; and
a haptic information recognition part that recognizes a change in the heights of the plurality of haptic elements, and outputs recognition information to the control part;
wherein the control part calculates an output force value and a height value by using the recognition information and checks a state of the visual-haptic variable button according to the output force value and the height value, the visual information output part outputs a button icon adaptively changed according to a change in the state of the visual-haptic variable button, and the haptic information output part outputs a sense of button manipulation and a sense of button touch, which are adaptively changed according to the change in the state of the visual-haptic variable button.

13. The apparatus of claim 12, wherein the haptic information output part adaptively changes a sense of button manipulation and a sense of button touch by the plurality of haptic elements changed according to the manipulation and touch of the visual-haptic variable button, thereby outputting the haptic information.

14. The apparatus of claim 12, wherein the visual information output part moves in a vertical direction or vibrates by the plurality of haptic elements changed according to the manipulation and touch of the visual-haptic variable button, and adaptively changes a shape, a size and a color of a button icon, thereby outputting the visual information.

15. The apparatus of claim 12, wherein the setting part sets layout information including a button size and a button type, and button attribute information as the button information, and the button attribute information includes icon image information according to a button state, output force function information, button state information, a button state critical value, and information on an initial height of a button.

16. The apparatus of claim 12, wherein the control part compares the heights of the plurality of haptic elements with a button state critical value of the visual-haptic variable button to check the change in the state of the visual-haptic variable button, and the button state critical value includes one of a touch state critical value, a pressed state critical value, and a click state critical value of the visual-haptic variable button.

17. A method for providing visual-haptic information through a visual-haptic variable button, the method comprising:

setting layout information including a button size and a button type, an icon image according to a button state, an output force function, a button state, a button state critical value, and an initial height of a button with respect to the visual-haptic variable button;

generating setting information of visual-haptic information provided through the visual-haptic variable button; and adaptively changing a button icon, a sense of button manipulation, and a sense of button touch according to the setting information, thereby providing the visual-haptic information through the visual-haptic variable button, wherein a height of the visual-haptic variable button is changed according to manipulation and touch of the visual-haptic variable button, and in the providing of the visual-haptic information, haptic information is provided by adaptively changing the sense of button manipulation and the sense of button touch according to a height of the visual-haptic variable button, and visual information is provided by adaptively changing a shape, a size and a color of the button icon according to the height of the visual-haptic variable button.

* * * * *